(12) United States Patent
Hitchens

(10) Patent No.: US 10,603,699 B2
(45) Date of Patent: Mar. 31, 2020

(54) CHEMICAL JUG WASHER AND DISPOSAL ASSEMBLY

(71) Applicant: Paul Thomas Hitchens, Hessel, MI (US)

(72) Inventor: Paul Thomas Hitchens, Hessel, MI (US)

(*) Notice: Subject to any disclaimer, the term of this patent is extended or adjusted under 35 U.S.C. 154(b) by 49 days.

(21) Appl. No.: 16/008,798

(22) Filed: Jun. 14, 2018

(65) Prior Publication Data

US 2018/0290189 A1 Oct. 11, 2018

Related U.S. Application Data

(63) Continuation-in-part of application No. 15/095,332, filed on Apr. 11, 2016, now abandoned.

(Continued)

(51) Int. Cl.
*B08B 9/093* (2006.01)
*B09B 3/00* (2006.01)
(Continued)

(52) U.S. Cl.
CPC ........ *B09B 3/0058* (2013.01); *B05B 13/0609* (2013.01); *B05B 13/0627* (2013.01);
(Continued)

(58) Field of Classification Search
CPC ........ B08B 9/0852; B08B 9/20; B08B 9/205; B08B 9/24; B08B 9/30; B08B 9/34;
(Continued)

(56) References Cited

U.S. PATENT DOCUMENTS

| 403,951 A | 5/1889 | McKenney |
|---|---|---|
| 2,633,399 A | 3/1953 | Haas |

(Continued)

FOREIGN PATENT DOCUMENTS

| DE | 1607991 A1 * 10/1970 | ........... B09B 3/0058 |
|---|---|---|
| DE | 10250053 A1 * 1/2004 | .............. A61L 11/00 |

(Continued)

OTHER PUBLICATIONS

DE10250053—Machine Translation (Year: 2004).*
FR2886207—Machine Translation (Year: 2006).*
DE1607991—Machine Translation (Year: 1970).*

*Primary Examiner* — Marc Lorenzi
(74) *Attorney, Agent, or Firm* — Dinsmore & Shohl LLP (57) ABSTRACT

A combination cleaning and disposal assembly for safely cleaning and rendering unusable a jug containing a hazardous chemical residue. A body supports a receiving chamber for receiving the jug. A manifold is supported by the body and has a plurality of spikes arrayed toward the jug. A pressurized fluid source is communicated to the manifold such that, upon an inter-displacement occurs between the manifold and the container, the spikes are caused to pierce the container, the pressurized fluid being caused to issue from the spikes to clean an interior of the container. A floor of the chamber has irregular surfaces to assist in deforming the jug during puncturing and outflow of contaminated fluid. A drain is located underneath the jug receiving chamber which collects and segregates the fluid contaminated with the chemical residue for securing disposal concurrent with removing and disposing of the cleaned and punctured jug.

16 Claims, 7 Drawing Sheets

Related U.S. Application Data (60) Provisional application No. 62/178,745, filed on Apr. 20, 2015.

(51) Int. Cl.

| | | |
|---|---|---|
| *B26F 1/24* | (2006.01) | |
| *B05B 13/06* | (2006.01) | |
| *B08B 9/34* | (2006.01) | |
| *B08B 9/08* | (2006.01) | |
| *B08B 17/02* | (2006.01) | |
| *B05B 1/20* | (2006.01) | |
| *B05B 15/70* | (2018.01) | |
| *B05B 14/00* | (2018.01) | |

(52) U.S. Cl.
CPC ............ *B08B 9/0852* (2013.01); *B08B 9/093* (2013.01); *B08B 9/34* (2013.01); *B08B 17/025* (2013.01); *B26F 1/24* (2013.01); *B05B 1/20* (2013.01); *B05B 14/00* (2018.02); *B05B 15/70* (2018.02)

(58) Field of Classification Search
CPC ... B08B 9/0813; B08B 9/0821; B08B 9/0826; B08B 9/093; B30B 15/08; B65B 69/0014; B05B 13/0609; B05B 13/0627; B26F 1/24; B09B 3/0058; B67B 7/24; B67B 7/26; B67B 7/28
See application file for complete search history.

(56) References Cited

U.S. PATENT DOCUMENTS

| | | | |
|---|---|---|---|
| 2,947,311 A | 8/1960 | Fox | |
| 3,916,924 A | 11/1975 | Mc Gowan | |
| 4,334,469 A * | 6/1982 | Tanner | ................... B30B 15/08 100/110 |
| 4,961,440 A | 10/1990 | Wright | |
| 5,027,840 A | 7/1991 | Nezworski | |
| 5,291,921 A * | 3/1994 | Devine | ................. B09B 3/0058 141/106 |
| 5,542,440 A | 8/1996 | Weimer et al. | |
| 5,640,643 A | 6/1997 | Holtz et al. | |
| 5,702,536 A | 12/1997 | Carruth | |
| 6,584,665 B1 * | 7/2003 | Sabesky | .................. B30B 15/08 29/403.3 |
| 6,834,690 B2 | 12/2004 | Michaud | |
| 7,726,593 B2 | 6/2010 | Heidel | |
| 7,753,009 B2 | 7/2010 | Quddus et al. | |
| 2005/0145270 A1 | 7/2005 | Ray | |
| 2010/0132740 A1 | 6/2010 | Lehmann et al. | |
| 2012/0227859 A1 | 9/2012 | Ahrenholtz et al. | |
| 2012/0235548 A1 | 9/2012 | Cordes et al. | |
| 2015/0101286 A1 | 4/2015 | Clarkson | |
| 2015/0239016 A1 | 8/2015 | Spencer et al. | |

FOREIGN PATENT DOCUMENTS

| | | | | |
|---|---|---|---|---|
| FR | 2886207 A1 * | 12/2006 | ............... | B30B 9/06 |
| GB | 1350361 A | 4/1974 | | |
| WO | 2012/031955 A2 | 3/2012 | | |
| WO | 2015/075902 A1 | 5/2015 | | |

* cited by examiner

CHEMICAL JUG WASHER AND DISPOSAL ASSEMBLY

CROSS-REFERENCE TO RELATED APPLICATIONS

The present application claims the priority of U.S. Ser. No. 15/095,332 filed Apr. 11, 2016. The '332 application claims the priority of U.S. Ser. No. 62/178,745, filed Apr. 13, 2015, the contents of which is incorporated herein in its entirety.

FIELD OF THE INVENTION

The present invention relates generally to washing and disposal assemblies for plastic containers, such as containing residue of chemical or hazardous style waste. More specifically, the present invention teaches a self-contained combination chemical jug rinse and destruction/disposal assembly which provides for pressurized cleaning and concurrent puncturing destruction of the jug, following which the cleaned/destroyed jug is removed (such as for recycling) and the contaminated fluid rinse is transferred to a sealed tank/reservoir for safe disposal.

BACKGROUND OF THE INVENTION

Many types of hazardous chemicals are contained within plastic style jugs or containers, such including but not limited to chemical filled jugs for industrial, pesticide or other applications. Current disposal protocol for emptied jugs (such as which container such chemical residue) is to utilize a hand-held garden hose and jug piercing/puncturing tool, as reuse of the jug is not practical as opposed to providing for destruction and/or secure and sanitary disposal. Aside from the user having to wear protective clothing and respiration gear, additional difficulties include the requirement of collecting the contaminated water rinse, such as which would otherwise cause drainage into the ground or public sewer.

U.S. Pat. No. 4,961,440, to Wright, teaches a chemical dispensing apparatus for emptying and rinsing containers of chemicals, with dilution of chemical. The apparatus includes a chamber in which the container can be enclosed and supported, draining means provided at a lower portion of said chamber and a hollow perforated wash pipe mounted on the chamber so as to be moveable into the interior thereof to pierce twice any container supported therein, the wash pipe being connected to a diluent supply. The chamber is provided with means for supporting the container in a generally tilted manner such that a corner thereof is presented as the lowest portion and the wash pipe is arranged to pierce the container through the corner, means being provided on the wash pipe to hold apart the lowest pierced portion of the container and one or more nozzles being provided to spray diluent over a substantial part of the interior of the container while the pierced portion is held apart.

U.S. Pat. No. 6,834,690, to Michaud, teaches an apparatus for drying a wafer includes a rotating chuck configured to rotate the wafer. A movable de-ionized water supply member and an organic solvent supply member are positioned adjacent a face of the wafer. The de-ionized water supply member supplies de-ionized water onto the wafer, and the organic solvent supply member has a plurality of solvent supply nozzles disposed to supply an organic solvent onto the wafer. The organic solvent supply member includes a first solvent supply member and a second solvent supply member. The de-ionized water supply member and the first solvent supply member move radially between a position adjacent the central portion of the wafer and the edge portion of the wafer.

Another example of an existing apparatus for emptying and rinsing containers is depicted in U.S. Pat. No. 3,916,924, to McGowan, in which a member is inserted into and locked in the opening of the pesticide container. The member evacuates the contents of the container and rinses to render the container disposable.

Butler, U.S. Pat. No. 4,039,351, teaches a removable washer attachment including an insert with both exterior and interior container extending portions. The insert is fluid-tight sealed to the container opening with another seal provided between the bore and a suction tube inserted therein. Washing fluid is admitted into the bore and is channeled through passages into curved notches disposed in a lower segment of the interiorly depending container insert portion. The washing fluid is sprayed upwardly and contacts the inside top and side walls of the container or interiorly held disposable bag. The residue material is washed downwardly to the bottom of the container where it is removed through the suction tube.

WO 2012/031955, to Feistmantl Cleaning Systems GMBH, teaches a container cleaning system and method having a closable cleaning chamber, a nozzle system for cleaning a container to be cleans, and a charging means for introducing the containers into the cleaning chamber and for discharging the cleaned containers. A container drive means moves the container for cleaning of the its exterior by such that a relative movement between the outer wall of the container and the nozzle system is generated.

Other references of note include each of the washer with bio prevention cycle of Quddus, U.S. Pat. No. 7,753,009, the parts washer of Spencer, US 2015/0239016 and the beverage jug cleaning system of Clarkson, US 2015/0101286.

SUMMARY OF THE INVENTION

The present invention teaches a combination cleaning and disposal assembly for safely cleaning and rendering unusable a jug containing a hazardous chemical residue. The assembly incorporates a frame, such including welded aluminum supports, containing an upper jug receiving chamber. A first loading tray provides for introduction of a contaminated jug into the receiving chamber.

A jug piercing manifold is positioned above the jug placed within the receiving chamber and includes any number of hollowed and fluid communicating spikes for successively impaling and pressure washing the container. A high pressure pump draws fresh water from a first proximately located tank or reservoir frame for communication, via one or more lines, to the impaling spikes forming the displacing manifold.

The pressurized fluid flows across the contaminated interior of the jug and then out through a bottom of the container (typically laying on its side) which has been completely through punctured by the pointed tips of the spikes. The floor of the jug receiving chamber may further exhibit a spaced grid or other apertured support surface which allows the tips of the spikes to pass unimpeded through the floor support to facilitate through drainage of the contaminated fluid.

In a further embodiment, the floor is constructed with non-planar surfaces, such in particular having angled recessed profiles formed as a plurality of individual pockets which align with the profile of the manifold spikes, and which cause the jug to deform at the location of the spikes passing through the jug and progressively through the floor apertures. In this fashion, the floor of the chamber provides for faster and more complete flushing and drainage of the chemical residue from within the jugs while further contributing to the intended destruction of the jug to prevent re-use.

The contaminated fluid subsequently drains into a second proximately located chemical rinse and storage tank for secure disposal. The cleaned and impaled/compressed jug is now rendered unusable and can be removed from the assembly, typically from a second jug removal tray located in communication with the receiving chamber on an opposite side from the first loading tray.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
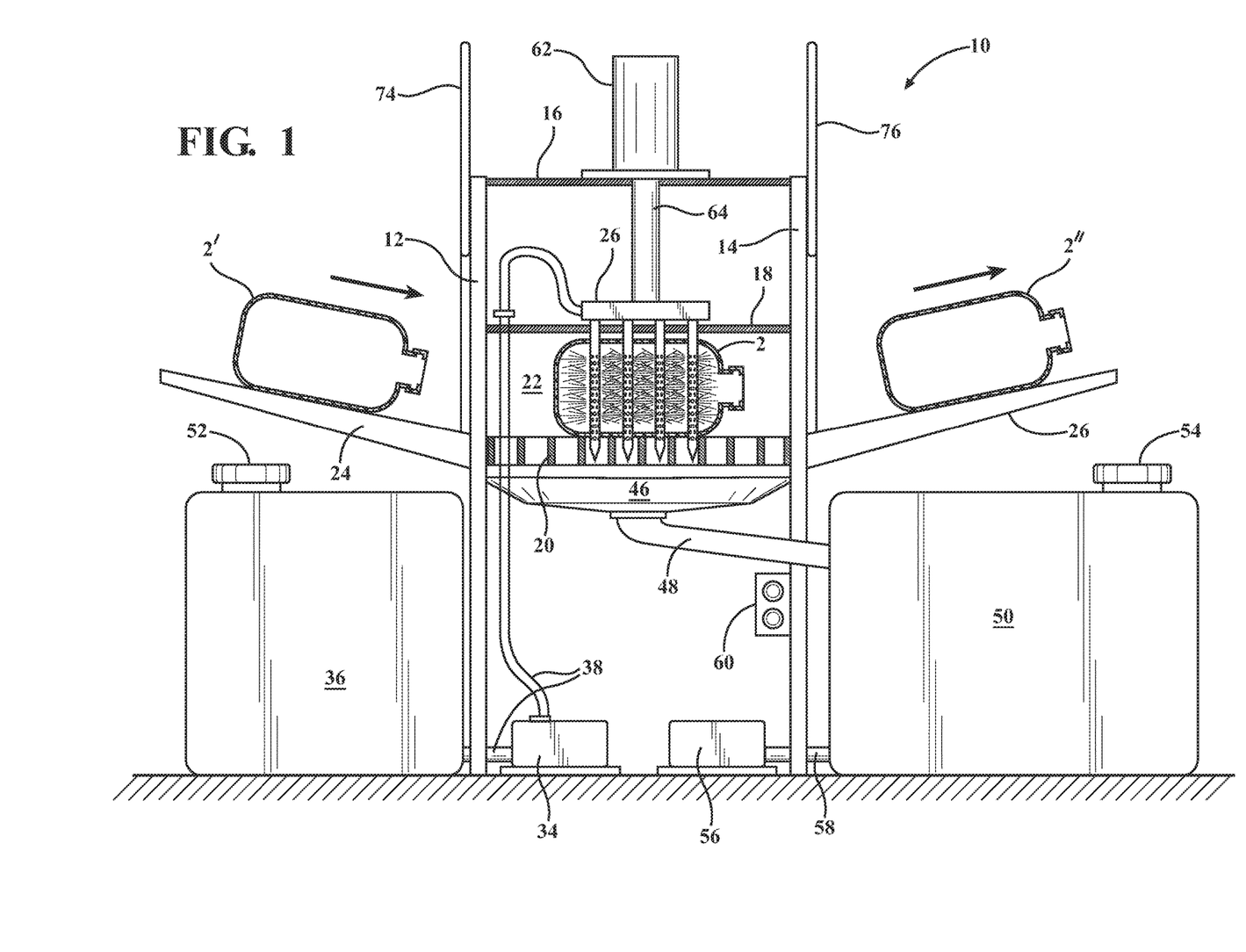
FIG. 1 is a plan view of the chemical jug washing and disposal assembly according to one non-limiting variant, with the interior of the frame depicted in cutaway to exhibit the jug receiving chamber and downwardly displaceable spike piercing manifold, along with both the first jug loading tray and second jug removal tray.

With reference to the attached illustrations, the present invention teaches a combination cleaning and disposal assembly, see generally at 10 in FIG. 1, for safely cleaning and rendering unusable a jug containing a hazardous chemical residue. The assembly incorporates a body, such as without limitation a frame including welded aluminum supports including in plan cutaway vertical extending supports 12, 14, et seq. and interconnecting horizontally spaced supports 16, 18, et seq. As shown, the body exhibits a generally rectangular configuration if viewed in three dimension however can further have any suitable shape.

As further shown, the body (or frame) includes a horizontally extending grate or other support 20 which is located a distance below the horizontal support surface 18, the space defined therebetween being a jug receiving chamber 22 within which is inserted a residue contaminated jug 2. A first loading tray 24 provides for introduction of a succeeding contaminated jug 2' into the receiving chamber 22, with a second opposite extending loading or unloading tray 26 providing for removal of a preceding and cleaned/destroyed jug 2" which is safe for disposal or recycling.

Without limitation, the trays 24/26 can be utilized solely to place or remove jugs to and from the receiving chamber 22 or can be additionally used to support the jugs during pre or post rinsing thereof, such as in order to remove addition contaminants residing on the exterior of the jugs. The jug 2 depicted in FIGS. 2-3 is shown with a rectangular cross section, such defining a 2.5 gallon reservoir, however it is understood that these can exhibit any suitable shape or volumetric holding capacity.

Figure 2:
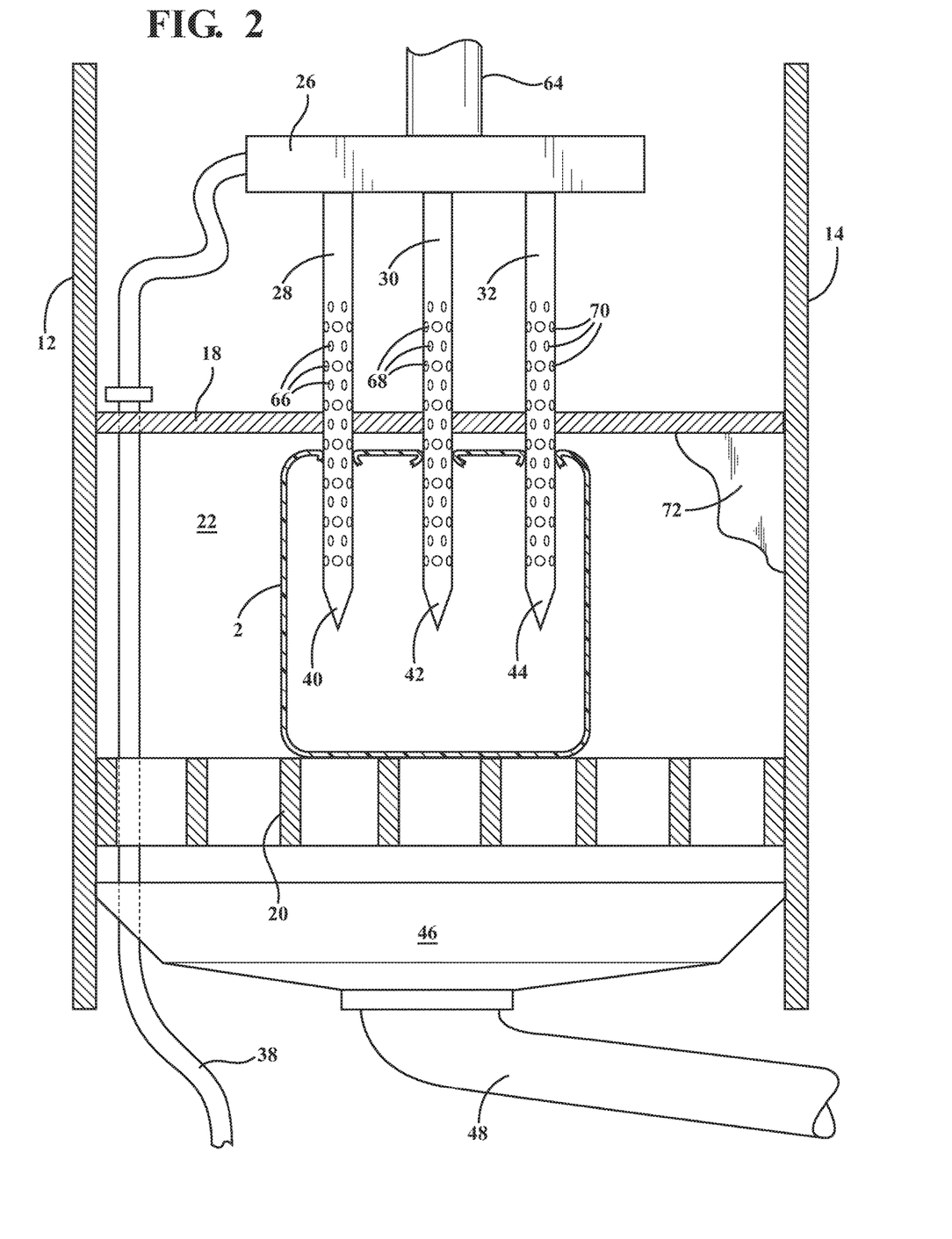
FIG. 2 is an enlarged plan view of the receiving chamber and illustrating the spike manifold in an intermediate puncturing position.
Figure 3:
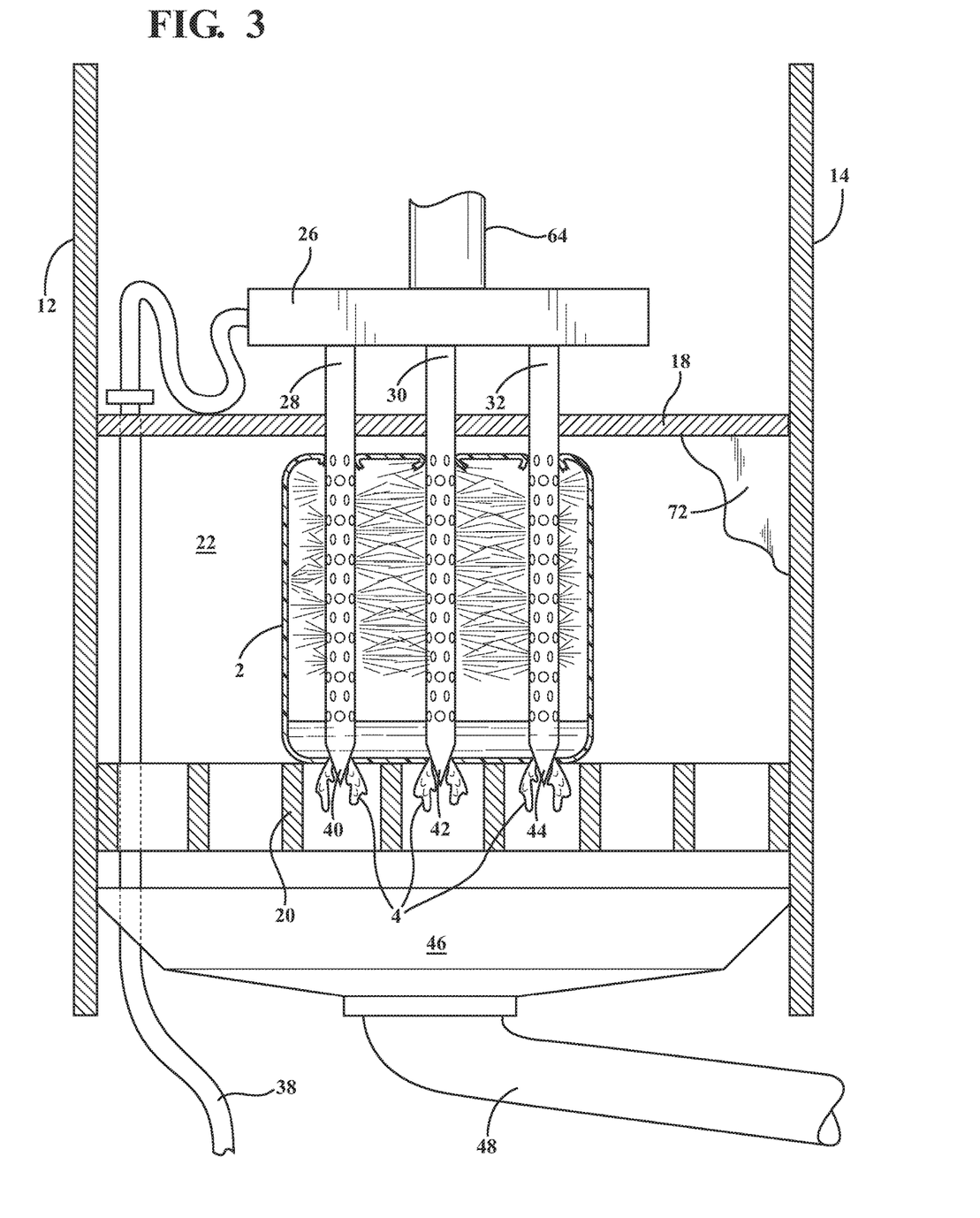
FIG. 3 is a succeeding illustration to FIG. 2 showing the spikes in a fully descended and jug impaling condition in which the outflow drainage of contaminated fluid is shown descending through a bottom grate support associated with the receiving chamber prior to collecting within the rinse tank.

A jug piercing manifold 26 is positioned above the jug 2 placed within the receiving chamber 22 and includes any number of hollowed and fluid communicating spikes, see further at 28, 30, 32, etc., in FIGS. 2-3, for successively impaling and pressure washing the jug 2 or other container. A high pressure pump 34 draws fresh water or other cleaning fluid from a first proximately located tank or reservoir 36, via an inlet line 38. An outlet line 38 extends to the manifold 26 and to the impaling spikes 28, 30, 32, et seq. forming the displacing manifold.

As further best shown in each of the intermediate piercing view of FIG. 2 and the fully pierced view of FIG. 3, the pressurized fluid flows across the contaminated interior of the jug 2 and then out through a bottom of the container (typically laying on its side) which has been completely through punctured by pointed tips, further at 40, 42, 44 et seq. of the spikes 28, 30, 32. As further previously described, the floor (again at 20) of the jug receiving chamber is exhibited by a spaced grid or other apertured support surface which allows the tips 40, 42, 44 et seq. of the spikes 28, 30, 32, et seq, to pass unimpeded through the floor support to facilitate through drainage of the contaminated fluid, see at 4 in FIG. 3.

The contaminated fluid subsequently drains, via an underneath located collection pan 46 and connecting drain 48 into a second proximately located chemical rinse and storage tank 50 for secure disposal. As further shown in FIG. 1, both the first fresh water tank 36 and the second rinse tank 50 include top screw cap ports, at 52 and 54, respectively, these providing respectively for refill of emptying of the tanks. A sump pump 56 is also incorporated into the frame in fluid communication with the contaminated rinse tank, see line 58, for controlled drain disposal of the collected fluid.

An on/off switch 60 is secured to a visible location of the frame and, via an associated power supply and wiring (not shown) is configured for reciprocatingly displacing in bi-directional linear motion the manifold 26 and spikes 28, 30, 32, et seq. into successive piercing and retracting motions relative to each successively loaded jug within the receiving chamber. To this end, the horizontal support 18 above the receiving chamber 22 in turn supports a fixed cylinder 62 associated with the bi-directional linear drive, a reciprocating shaft 64 projecting downwardly from the cylinder 62 and supporting at its end the manifold 26 and plurality spikes 28, 30, 32, et seq. in downwardly projecting fashion.

Although not shown, it is understood that the manifold 26 receiving the pressurized fluid via the internal fluid conveying network (see again pressurized fluid line 38) is in communication with a hollow interior of each projecting spike, and typically by the interior of the manifold having a channel network communicating fluid flow to a hollow top inlet location for each of the spikes 28, 30, 32, et seq., these in turn being internally hollowed with perforations there along (further individual pluralities of which are best shown at 66, 68, 70 et seq. for spikes 28, 30, 32. et. seq) and for issuing the pressurized fluid within at least an interior of the pierced container as depicted in each of FIGS. 2-3.

As further depicted in each of FIGS. 1 and 3, the second horizontal support 18 located below the (generally flattened and plate shape) manifold 26 and allows for a complete range of reciprocating (typically bi-directional vertical) motion of the manifold and spikes through the support 18, an underside surface of the support 18 being further understood to be employed so as to forcibly dislodge the container from the spikes during (upward) retraction of the spikes through the second support 18. Without limitation, it is understood that additional embodiments may contemplate an arrangement in which a repositioned and reconfigured manifold is displaced either sideways or upwardly, yet additional embodiments envisioning the manifold being fixed and the container and its associated support surface being bi-directionally displaced both toward and away from the manifold and spikes.

Additional features include at least one extending side of the sealed enclosure defining the jug receiving chamber further including a transparent window (see partial designation at 72 in each of FIGS. 2-3). In a specific non-limiting embodiment, the at least one window can further be provided as a multi-sided plexi glass enclosure surrounding the jug receiving chamber, with first and second doors (these further depicted in non-limiting fashion as slide-up doors 74 and 76 in FIG. 1) configured within associated enclosure defining panels and communicating with the first 24 and second 26 trays.

Figure 4:
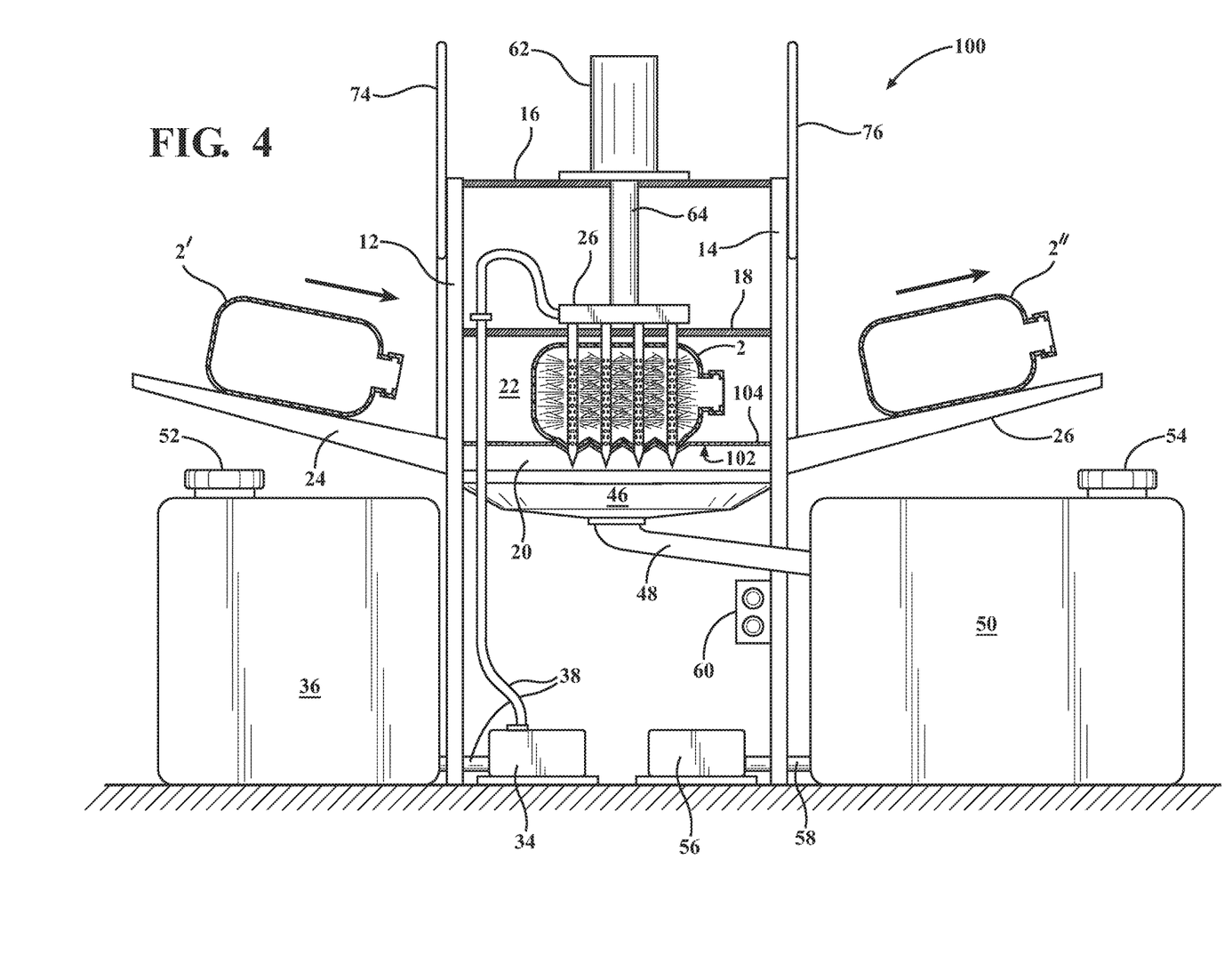
FIG. 4 is an illustration similar to FIG. 1 of the chemical jug washing and disposal assembly according to a further embodiment and illustrating the irregular surface profile of the chamber floor for facilitating puncturing and deformation of the jug to expedite flushing of the chemical residue from the jug interior by the fluid spray issuing spikes with expedited drainage of the contaminated fluid through the lower located tray and outlet.

FIG. 4 is an illustration similar to FIG. 1 of the chemical jug washing and disposal assembly 100 according to a further embodiment which is largely identical to that shown in FIG. 1, with the exception that the grid style floor of the jug receiving chamber is redesigned at 102 to exhibit a planar outer perimeter 104 bounding an interior and irregular surface profile for facilitating puncturing and deformation of the jug 2 and to expedite flushing of the chemical residue from the jug interior by the fluid spray issuing spikes 28, 30, 32, et seq. with expedited drainage of the contaminated fluid through the lower located tray and outlet.

Figure 5:
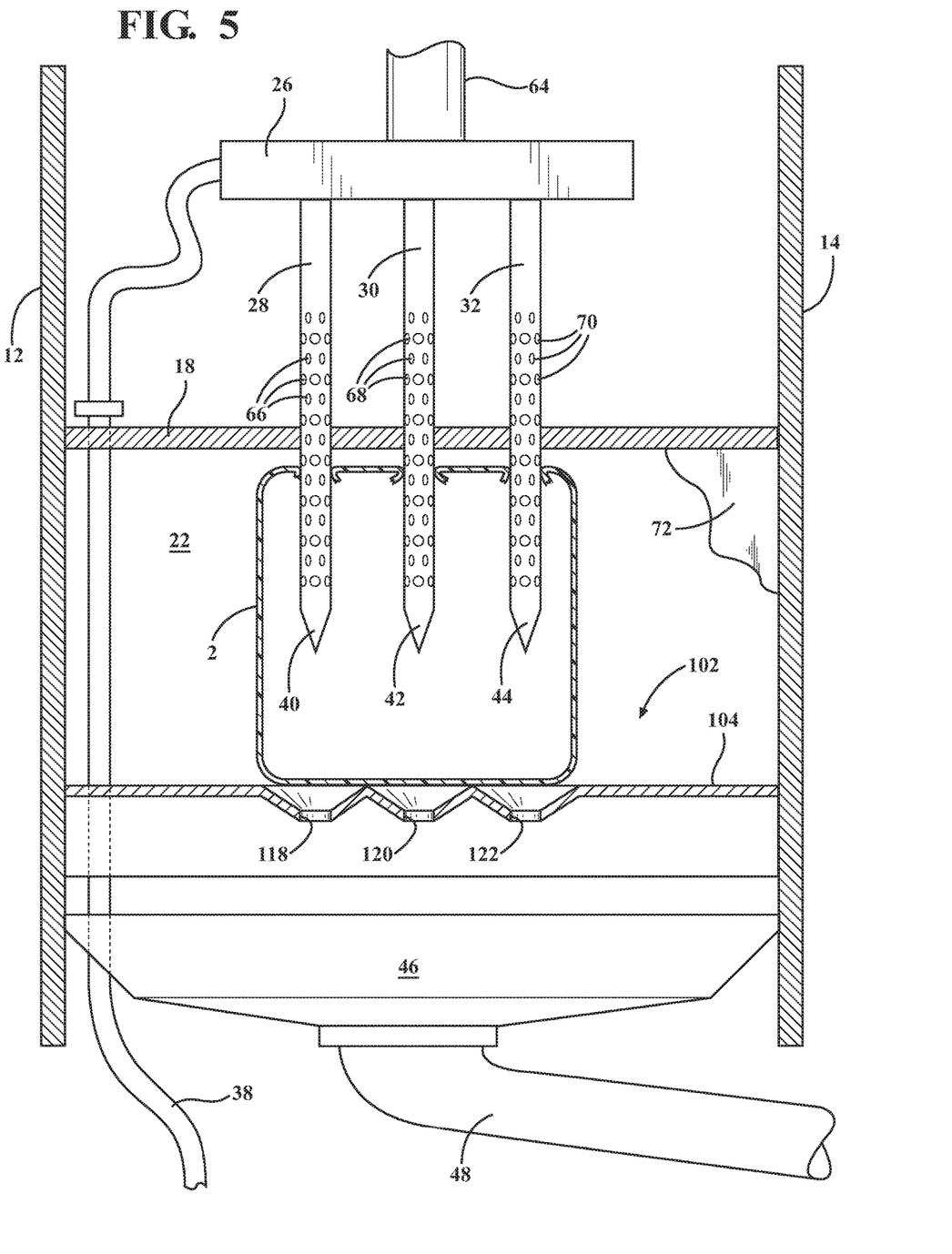
FIG. 5 is an enlarged plan view of the receiving chamber of FIG. 4 and illustrating the spike manifold in an intermediate puncturing position.
Figure 6:
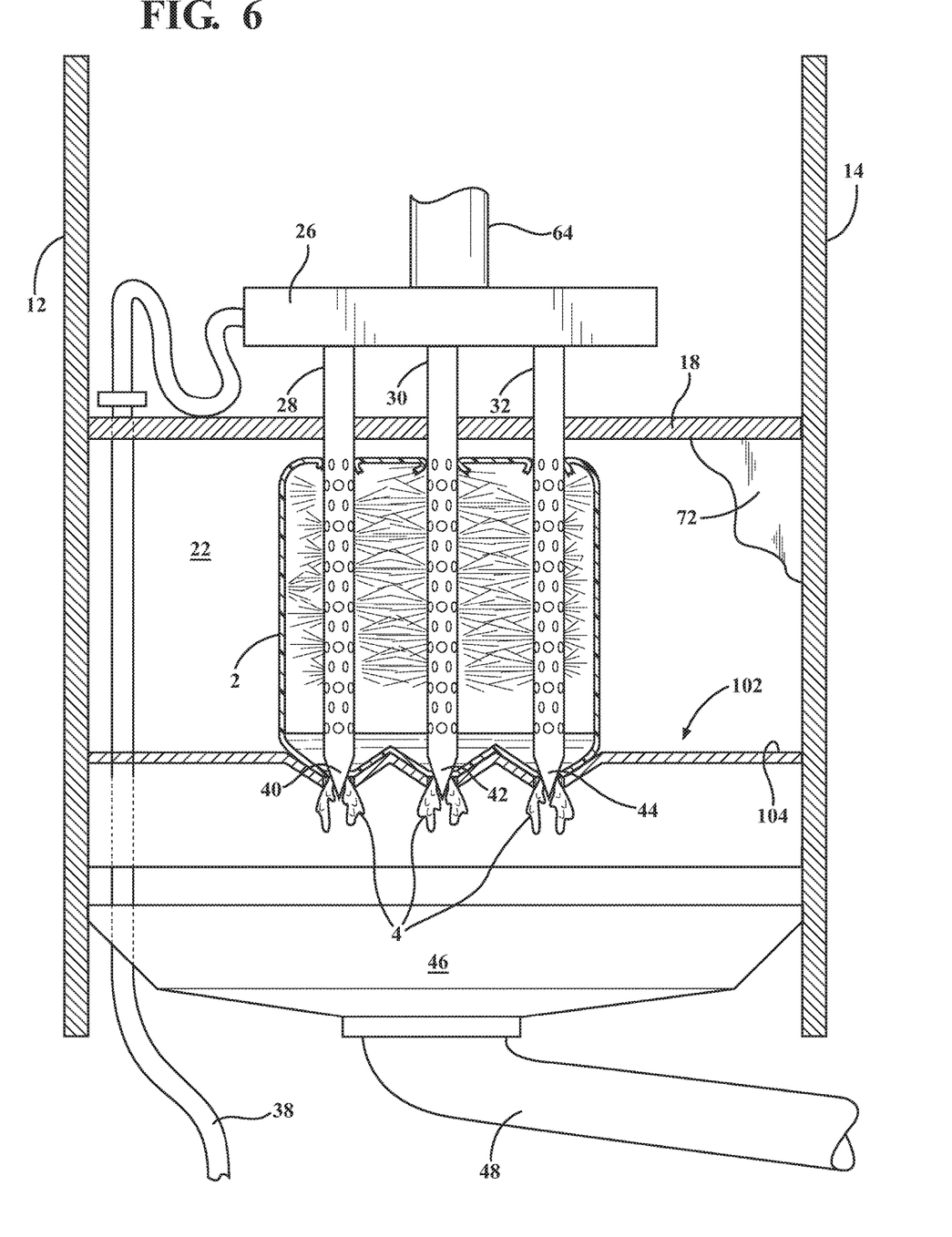
FIG. 6 is a succeeding illustration to FIG. 5 showing the spikes in a fully descended and jug impaling condition in which the outflow drainage of contaminated fluid is shown descending through the irregular floor profile associated with the receiving chamber prior to draining through the underneath located tray and collecting within the rinse tank.
Figure 7:
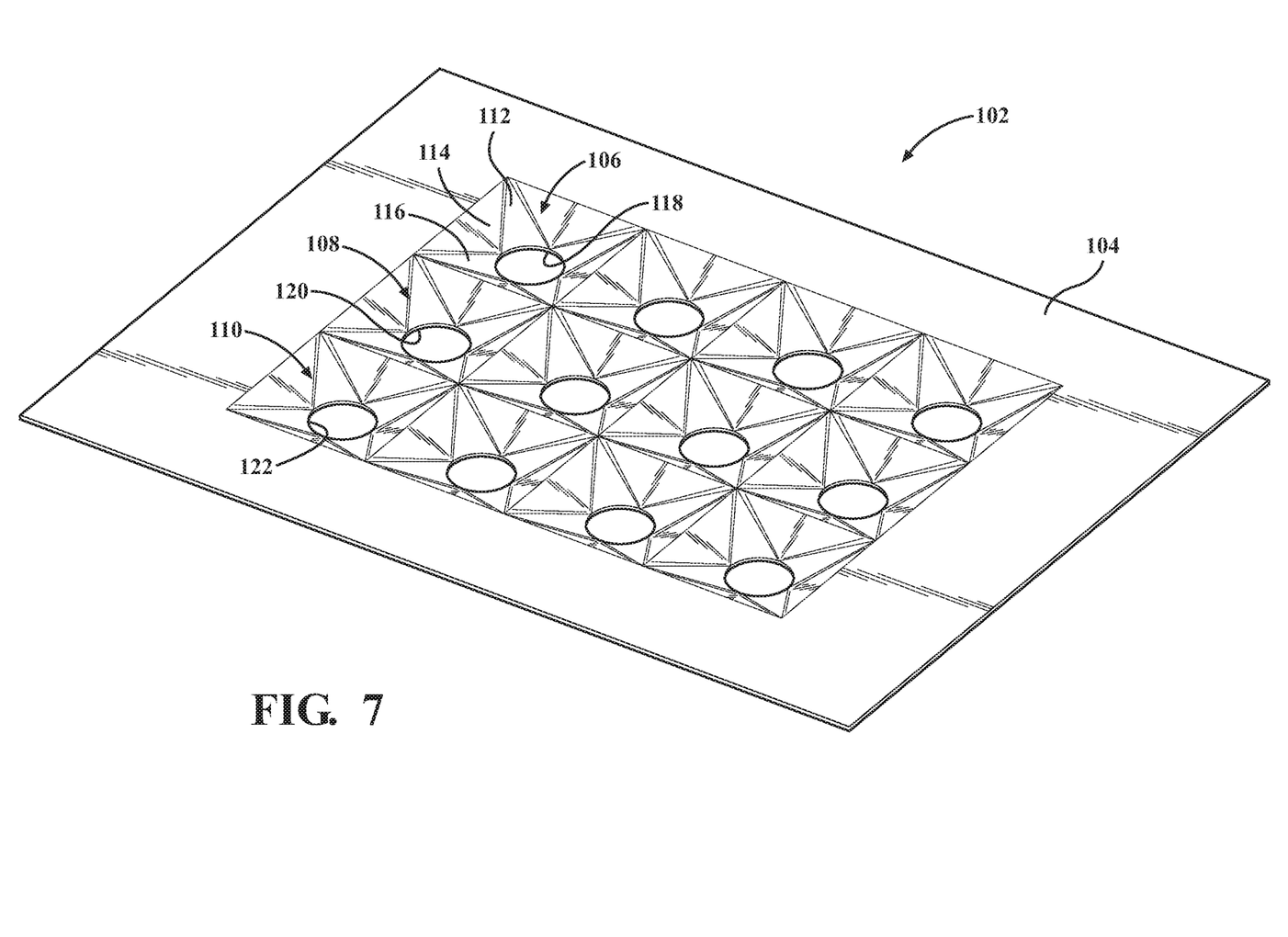
FIG. 7 is an illustration of the floor of the receiving chamber in the embodiments of FIGS. 4-6 and better showing the configuration of the individual drainage pockets associated with each of the descending spikes, the pockets each exhibiting recessed angled surfaces for facilitating outflow and drainage of contaminated fluid resulting from spraying of pressurized fluid/water from the spikes within the interior of the jugs, the contaminated fluid draining through the puncture locations in the jug initiated by the tips of the spikes, this action causing the jug to deform against the pockets to further expedite drainage.

FIG. 7 is an illustration of the floor of the receiving chamber in the embodiment of FIGS. 4-6 and better shows the configuration of a plurality of individual drainage pockets, at 106, 108, 110, et seq., formed into the chamber floor 102 and associated with each of the descending spikes. As shown, the pockets each exhibiting recessed angled surfaces (by example shown by interconnected surfaces 112, 114, 116, et seq. for selected pocket 106) and for facilitating outflow and drainage of contaminated fluid resulting from spraying of pressurized fluid/water from the spikes within the interior of the jugs.

The contaminated fluid drains through the puncture locations in the jug initiated by the tips of the spikes, this action causing the jug to deform against the pockets to further expedite drainage (as shown in FIGS. 4 and 6). Apertures are defined centrally within the recessed pocket of each of the non-planar angled surfaces, these defined by interior rim edges 118, 120, 122, et seq. for pockets 106, 108, 110, et seq. The diameter of the inner perimeter edge defining apertures is such that the tips 40, 42, 44 of the spikes (an optionally the full diameter of each spike) can project a distance beyond the floor 102 for assisting in quick cleaning and draining of the fluid from the jug compartment.

FIG. 5 is an enlarged plan view of the receiving chamber of FIG. 4 and illustrating the spike manifold in an intermediate puncturing position, with FIG. 6 providing a succeeding illustration to FIG. 5 showing the spikes in a fully descended and jug impaling condition in which the outflow drainage of contaminated fluid is shown descending through the irregular floor profile associated with the receiving chamber prior to draining through the underneath located tray and collecting within the rinse tank. The diameter of the floor apertures 118, 120, 122, et seq. is again in alignment with the tips of the spikes to ensure that the jugs 2 are each fully impaled and deformed as shown in FIG. 6 and further that the result is that the contaminated interior is adequately cleaned for normal disposal, with the jug being ensured not to be reusable. The tips of the spikes are further understood to travel any intermediate distance between the floor 102 and the underneath located receiving pan or tray 46, the design of which is intended to prevent puncturing or damage to the tray.

Without limitation, the recessed or other irregular configuration of the floor of the jug receiving chamber can be further modified from that shown so as to include any other envisioned non-planar configuration (including other than individual receiving pockets) which assists in deforming the jug, such as at the point of the spike tips puncturing through the jug. This can include the formation of concave or angled surfaces from the pocket version shown to one which extends the entire length or width of the floor.

The diameter and profile of the individual apertures in the floor is again further capable of being varied from that shown to facilitate flow through drainage of the contaminated fluid once washed out through the jug interior. This can include the apertures having a non-circular pattern to enhance flow through once the spike tips project therethrough (again FIG. 6).

Without limitation, the floor 102 (such as including a rigid metal or other suitable durable material) can be provided in combination the vertical supports 20 located under the floor grid in the variant of FIGS. 1-3. It is envisioned that the floor 102 is adequately durable to be provided without any underneath reinforcement beyond that associated with the anchoring of the floor to the inner facing rim edges of the jug receiving compartment 22.

Having described our invention, other and additional preferred embodiments will become apparent to those skilled in the art to which it pertains, and without deviating from the scope of the appended claims. This can include reconfiguring the frame and manifold such that the manifold can be caused to be fixed (thus dispensing with the need of a linear reciprocating drive), such instead being integrated into an elevator type arrangement associated with the floor grate or other support of the contaminated jug receiving chamber, and so that it can be caused to be vertically displaced into each of a first (elevating) contact with the downwardly arrayed spikes, following which the subsequent descending of the floor grate or support ensures that the jug is extracted from the spikes (this further accomplished by otherwise temporarily affixing or securing the jug to the floor grate in some secure manner.

Other variants can be provided without either or both of the first supply and second contaminated rinse collection tanks. This can include a city water inlet being directly communicated to the high pressure water pump and/or an outlet extending from the drain and to some other secure contaminated collection sink or reservoir (either with or without a sump pump as shown).

I claim:

1. A combination cleaning and disposal assembly for a jug containing a chemical residue, comprising:
   a body having a chamber for receiving the jug;
   a manifold communicating with said chamber, said manifold having a plurality of spikes arrayed toward the jug;
   a pressurized fluid source communicated through said manifold and an interior of each of said spikes such that, upon displacement of said spikes, said spikes being caused to pierce the jug, the pressurized fluid being caused to issue from apertures in said spikes to clean an interior of the jug;
   a floor of said chamber adapted to support the jug, wherein a plurality of drainage pockets are formed in said floor, each of said pockets having a plurality of angled surfaces arranged with edges to collectively complete a rectangular profile, each of said plurality of angled surfaces further comprising a rim edge at a lowermost portion so as to collectively define a central aperture in each pocket;
   wherein said spikes pierce though the jug and the tips of said spikes pass through said central apertures, the jug adapted to being deformed; and
   a drain located underneath said floor for redirecting the fluid, now contaminated with and containing the chemical residue from the jug, from said chamber.

2. The assembly as described in claim 1, further comprising a collection pan positioned under said floor which allows unimpeded travel of the tips of said spikes beyond the jug, and which collects and segregates the fluid containing the chemical residue for subsequent removal through said drain.

3. The assembly as described in claim 1, further comprising a reciprocating linear drive for displacing said manifold and said spikes into successive piercing and retracting motions relative to each successively loaded jug within said chamber.

4. The assembly as described in claim 3, further comprising a horizontal support above said chamber to which is secured a fixed cylinder associated with said reciprocating linear drive, a reciprocating shaft projecting downwardly from said cylinder and supporting said manifold and said plurality of spikes in a downwardly projecting fashion.

5. The assembly as described in claim 1, said pressurized fluid source further comprising a pump integrated into said body, a first conduit supplying the fluid into said pump, a second conduit supplying the pressurized fluid to said manifold.

6. The assembly as described in claim 5, further comprising a first fluid reservoir in communication with said first conduit.

7. The assembly as described in claim 1, further comprising said manifold receiving the pressurized fluid via an internal fluid conveying network in communication with said interior of each projecting spike, said apertures in said spikes defining perforations there along for issuing the pressurized fluid within at least an interior of the pierced jug.

8. The assembly as described in claim 1, further comprising a collection tank in communication with said drain for receiving the fluid containing the chemical residue.

9. The assembly as described in claim 1, said body further comprising a structural frame within which is integrated said chamber.

10. The assembly as described in claim 9, further comprising a first loading tray projecting from said chamber for introducing the jug into said chamber.

11. The assembly as described in claim 10, further comprising a second jug removal tray projecting from said chamber on an opposite side from said first loading tray.

12. The assembly as described in claim 8, further comprising a sump pump in communication with said collection tank for controlled removal of the fluid containing the chemical residue.

13. The assembly as described in claim 4, further comprising a second horizontal support located below said manifold and allowing for a complete range of reciprocating motion of said spikes through said second support to forcibly dislodge the jug from said spikes during retraction of said spikes upwardly and through said second support.

14. The assembly as described in claim 9, further comprising at least one transparent window defining a sealed enclosure surrounding said chamber.

15. The assembly as described in claim 11, said chamber having first and second doors for introducing and subsequently removing each jug along said first and second trays.

16. The assembly as described in claim 14, said sealed enclosure further comprising a plexi-glass enclosure.

* * * * *